United States Patent

Sommars et al.

[15] 3,692,883
[45] Sept. 19, 1972

[54] PROCESS

[72] Inventors: Gary L. Sommars, 63 Brittian Rd., Akron, Ohio 44305; Adel F. Halasa, 5040 Everett Rd., P.O. Box 244, Bath, Ohio 44210

[22] Filed: June 7, 1971

[21] Appl. No.: 150,837

Related U.S. Application Data

[63] Continuation-in-part of Ser. No. 854,267, Aug. 29, 1969, abandoned.

[52] U.S. Cl. ............................ 260/94.2 T, 260/83.7
[51] Int. Cl. ......................... C08d 3/04, C08d 3/06
[58] Field of Search ............ 260/94.2 T, 94.2 M, 83.7

[56] References Cited

UNITED STATES PATENTS 3,331,821  7/1967  Strobel ..................... 260/83.7

*Primary Examiner*—Joseph L. Schofer
*Assistant Examiner*—W. F. Hamrock
*Attorney*—S. M. Clark et al.

[57] ABSTRACT

Conjugated dienes are polymerized by a new catalyst system which permits control of the molecular weight and gives a more easily processed product. This catalyst system comprises (1) a sodium hydrocarbon compound having one to 10 carbon atoms in which the hydrocarbon portion is a primary, secondary or tertiary alkyl or an aryl radical, and (2) potassium hydroxide or preferably lithium hydroxide. The diene polymers produced by this process have controllable molecular weights in the range of 5,000 to 1,000,000, preferably 100,000 to 500,000, broad molecular weight distribution, high glass transition temperatures, high degree of branching and are more easily processed in the production of rubber and other compositions for commercial use.

13 Claims, No Drawings

PROCESS

This application is a continuation-in-part of copending application Ser. No. 854,267, filed Aug. 29, 1969, now abandoned.

BACKGROUND OF THE INVENTION

1. Field of the Invention

This invention relates to a process for the polymerization of dienes using a catalyst composition comprising a sodium hydrocarbon compound and potassium hydroxide or preferably lithium hydroxide.

2. Related Prior Art

The polymerization of conjugated dienes can be effected in a variety of methods. However, there are various disadvantages in the various methods presently known including undesirable or uncontrollable properties in the products, such as lack of control of molecular weight, molecular weight distribution and processibility of the polymers. For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, Vol. 94, October, 1963, pp. 87–92.

This Alfin catalyst system effects very rapid formation of a very high molecular weight polymer having molecular weight of about 5,000,000 with about 75 percent of the polymer in the trans-1,4 configuration. In contrast, polymerization by an alkyl sodium, such as amyl sodium, produces a much slower polymerization reaction to give a polymer having as high as 70 percent in the 1,2 configuration but with a molecular weight too low for the desired properties.

Polybutadienes prepared by the use of n-butyl lithium in n-hexane have about 8–10 percent 1,2, 53–54 percent trans-1,4 and 35–37 percent cis 1,4 configurations, which polymers do not have enough 1,2 configuration for the desired properties. By using polar modifiers or solvents, such as ethers, amines, etc., the vinyl content can be increased to up to 50–70 percent. However, the molecular weight distribution in such cases is so narrow as to give poor processibility. Moreover, the polar modifiers act as chain terminators and prevent active polymer products that might be coupled or otherwise post-treated to improve processibility. Processibility is very important for commercial rubber tire production. Among other disadvantages poor processibility results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

STATEMENT OF THE INVENTION

In accordance with the present invention, it has now been found that conjugated diene polymers of controllable molecular weight, broad molecular weight distribution, good processibility, high glass transition temperatures and good wet traction are produced by the use of a catalyst system comprising the combination of (1) a sodium alkyl or aryl, and (2) potassium hydroxide or preferably lithium hydroxide. A third component, namely a sodium halide, can be present in the catalyst system depending on the method used in preparing the sodium alkyl or aryl.

The hydrocarbon portion of the sodium hydrocarbon component has one to 10 carbon atoms, and even though larger groups can be used, there is no particular advantage. The hydrocarbon portion is alkyl or aryl, including aralkyl or alkaryl, and the sodium can be attached to a primary, secondary or tertiary carbon atom.

These can be prepared by the reaction of metallic sodium with the corresponding halohydrocarbon. In cases where it is desired to prepare the sodium hydrocarbon free of the byproduct sodium halide, this can be done by preparing it in a liquid which is a solvent for the sodium hydrocarbon but not for the sodium halide, such as diethyl ether, tetrahydrofuran, or other ether. Or after preparation in a hydrocarbon medium the sodium alkyl or aryl can be extracted in an ether solvent. Then after the salt has been separated from the solution by decantation or filtration, a higher boiling hydrocarbon is added and the ether removed by distillation, using reduced pressure to keep the temperature low.

In this catalyst combination the system is most active when there are 2–2.5 moles of the lithium hydroxide or potassium hydroxide per mole of the sodium hydrocarbon. If there is a mole per mole ratio, the catalyst is unsuitable, and if there is considerable excess of the hydroxide over the 2.5–1 mole ratio, the catalyst is much less effective compared with the 2–1 optimum ratio. However, as the ratio increases or decreases from this optimum amount, there is some activity since there will be at least a portion of the sodium hydrocarbon associated with two moles of the hydroxide. Consequently, it is desirable to keep within the range of 1.5–3 moles of hydroxide per mole of sodium hydrocarbon.

If a sodium halide is present, it is generally in the amount deposited by the reaction of sodium with the halohydrocarbon by which the sodium hydrocarbon is formed, so that generally there is a mole of sodium halide per mole of sodium hydrocarbon. The halide is generally the chloride or bromide, since these are more economical then the fluoride and iodide.

The catalyst can be prepared at room temperature, but preferably at 0° C., or even lower.

Typical sodium hydrocarbon compounds that can be used include compounds in which the hydrocarbon portion is methyl, ethyl, n-propyl, isopropyl, n-butyl, sec.-butyl, t-butyl, n-amyl, sec.-amyl, t-amyl, n-hexyl, sec.-hexyl, t-hexyl, n-octyl, 1,1,5-trimethyl pentyl, n-decyl, 1-methyl-2,4-diethyl pentyl, phenyl, tolyl, ethylphenyl, naphthyl, methylnaphthyl, benzyl, phenethyl, etc.

The catalyst is used in a proportion of 0.1 to 4.5 millimoles per 100 grams of monomer. Since the catalyst is regarded or can be calculated on the basis of moles of hydroxide per mole of sodium hydrocarbon compound, the number of millimoles of catalyst corresponds to the number of millimoles of sodium hydrocarbon compound.

The polymerization temperature is advantageously no higher than 125° C., and is preferably no higher than 70° C. While higher temperatures can be used, the vinyl content decreases as temperatures exceed 70° C.

Polybutadienes produced at temperatures of 125° C. or lower have molecular weights as high as 1,000,000, generally 100,000 to 500,000. Yields as high as 98–99 percent are easily produced. The 1,2 configuration in the polymer is at least 35 percent and generally in the range of 35 to 50 percent when the polymerization temperature does not exceed 70° C. It has been found that desirable wet traction or skid resistance properties require at least 35 percent 1,2 configuration in the polymers. In contrast corresponding emulsion polymers, which have low glass transition temperatures (−55° to −59° C.), also have poor wet traction properties. These polymers have 20–25 percent 1,2 configuration and 75–80 percent trans-1,4.

The dilute solution viscosity referred to herein is defined as the inherent viscosity determined at 25° C. on a 0.4 percent solution of the polymer in toluene. It is calculated by dividing the natural logarithm of the relative viscosity by the percent concentration of the solution, i.e., it is the inherent viscosity measured at 0.4 percent concentration.

The polymerization is advantageously effected in the presence of an inert diluent to facilitate handling of the polymer and to give better temperature control. Normally liquid hydrocarbons are preferred for this purpose, such as toluene, benzene, saturated aliphatic hydrocarbons preferably of the straight chain variety, such as n-hexane, n-heptane, etc. However, where provision is made for external heat dissipation and temperature control the solvent can be omitted.

The polymerization is advantageously conducted in a pressure vessel to avoid loss of monomer and solvent, particularly if temperatures are to be used at or above the boiling point of either. Preferably the polymerization temperature is no higher than 70° C., since higher temperatures give progressively lower vinyl content with increase in temperature.

Conjugated dienes that may be polymerized in accordance with this invention include: 1,3-butadiene, isoprene, chloroprene, 2-phenyl-1,3-butadiene, piperylene, etc.

The molecular weights reported herein are determined from the inherent viscosities and are the number average molecular weight.

Although butadiene homopolymers are preferred in the practice of this invention, butadiene copolymers can also be used where the comonomers impart desirable properties and do not detract from the polymer properties. The comonomers are preferably olefins, such as butene-1, n-butene-2, isobutylene, n-pentene-1, n-pentene-2, and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl- styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, 1-isopropenyl-5-chloronaphthalene, vinyl diphenyl, vinyl diphenylethane, 4-vinyl-4'-methyl diphenyl, 4-vinyl-4'-chlorodiphenyl, and the like. Preferably such comonomers have no more than 12 carbon atoms. Where such comonomers used to be used, generally at least 1 percent, preferably at least 5 percent by weight should be used, and as much as 60 percent, preferably no more than 30 percent may be used.

SPECIFIC EMBODIMENTS OF THE INVENTION

The invention is illustrated by the following examples which are intended merely for the purpose of illustration and are not to be regarded as limiting the scope of the invention or the manner in which it may be practiced. Unless specifically indicated otherwise, parts and percentages are given by weight.

EXAMPLE I

To a 2-liter, three-necked flask which is equipped with a high speed air stirrer, a nitrogen gas-inlet, a dry ice reflux condenser and an external bath (maintained at −10° to −15° C.), there is added 1,200 ml. of dry hexane and then 53 ml. (47.0 gm.) of a 40 percent dispersion of sodium in mineral oil (containing 18.8 gm. of metallic sodium). This slurry is cooled to −10° C. and 43.0 gm. of dry n-butyl chloride is added slowly with high speed agitation. After the addition of the n-butyl chloride, the reaction mixture is stirred continuously for another 30 minutes. At the end of this time, 19.8 gm. of lithium hydroxide is added. The resultant mixture is stirred for an additional 60 minutes at −10° C. Then the slurry is transferred into two bottles and the bottles aged in a 25° C. bath for 14 to 16 hours. This aged catalyst contains 0.2 millimoles per ml. of slurry.

EXAMPLE Ia

The procedure of Example I is repeated except that the n-butyl chloride is added last. The sodium metal and lithium hydroxide are mixed in hexane at room temperature for 1 hour. After that the mixture is cooled and the n-BuCl added dropwise at −15° to −10° C. The mixture is then allowed to warm up to room temperature after addition is completed. After transferring under nitrogen into a 28-oz. bottle the catalyst is ready to use for initiating polymerization.

EXAMPLE II

To a moisture-free 28-oz. bottle which has been flushed with dry nitrogen, there is added 260 grams of a hexane solution containing 60 grams of butadiene, and the bottle capped with a rubber diaphragm capable of being penetrated by a hypodermic syringe. The solution is maintained at 30° C. and 0.20 millimoles of catalyst prepared as described in Example I is added with a hypodermic syringe under 50 lbs. of nitrogen pressure. The system is immediately closed and the bottle is rotated in a polymerization bath maintained at 30° C. for 16 hours. The resultant polymer is collected by pouring the mixture into a large amount of methanol and 20 ml. of an antioxidant, such as p-phenylenediamine. The polymer is dried and a polymer yield of about 100 percent of theoretical is obtained. The molecular weight of the polymer is approximately 200,000. Similar results are obtained when this procedure is repeated using the catalyst of Example Ia.

EXAMPLE III

The procedure of Example II is repeated a number of times using in one case an Alfin catalyst prepared according to the procedure described by Hansley and Greenberg in Rubber Journal, 146, 42 (1964), and in other cases the procedure of Example II is repeated identically, but varying the amount of catalyst used. The catalyst is prepared according to the procedure of Example I using 1.60 moles of sodium, 0.8 mole of n-butyl chloride and 1.0 mole of lithium hydroxide, and the catalyst is aged at 30° C. for 16 to 18 hours. In each case, there is no gel formed. The conditions and results are tabulated below in Table I. As will be noted, the molecular weight of the Alfin-catalyzed polymer, as indicated by the high dilute solution viscosity (DSV), is much higher than for the polymer produced with the catalyst system of this invention. It will also be noted that, whereas the Alfin catalyst produces a polymer having 20 percent 1,2 configuration, the polymers produced by the catalyst system of this invention range from 70.5 to 78 percent of this configuration. When the experiments are repeated at 70° C. and 100° C., similar results are obtained, except that the vinyl content of the product is progressively lower with higher temperatures.

TABLE I

| | mMoles Cat. per 60 pts. Butadiene | DSV | % Conv. | cis-1,4 | tr-ans-1,4 | 1,2 | $T_g$°C. |
|---|---|---|---|---|---|---|---|
| Alfin Catalyst | 1.8 | 13.5 | — | 10 | 70 | 20 | — |
| n-BuNa·LiOH | 0.4 | — | poor | | | | |
| " | 0.6 | 1.55 | 100.0 | 14.50 | 15.1 | 70.5 | −42 |
| " | 0.7 | 1.42 | 98.0 | 13.0 | 15.6 | 71.5 | −41 |
| " | 0.8 | 1.28 | 95.0 | 12.80 | 14.5 | 72.7 | −39 |
| " | 0.9 | 1.14 | 87.0 | 12.80 | 14.2 | 73.3 | −40 |
| " | 1.0 | 1.20 | 100.0 | 12.80 | 14.5 | 72.6 | −43 |
| " | 1.2 | 0.93 | 95.0 | 9.5 | 13.4 | 77.0 | −38 |
| " | 1.6 | 0.75 | 100.0 | 8.6 | 13.4 | 78. | |
| " | 2.0 | 0.59 | 100.0 | 11.8 | 13.0 | 75.2 | |
| " | 2.4 | 0.49 | 100.0 | 11.4 | 13.3 | 75.4 | |
| " | 2.8 | 0.42 | 100.0 | 13.8 | 13.8 | 72.4 | |
| " | 3.2 | 0.39 | 100.0 | 11.8 | 14.0 | 74.2 | |

EXAMPLE IV

Comparative tests are made on a polybutadiene prepared according to Example II and a butyl lithium-catalyzed polybutadiene of a type being used commercially for tire production. The polymer produced according to this invention shows a bulk viscosity almost three times as high as the commercial type butyl lithium-catalyzed polybutadiene. However, the new polymer shows only slightly higher inherent viscosity measurements than for the commercial type. This information together with the respective molecular weight distribution determinations shows that the polymers of this invention are highly branched. Moreover, the overall processibility characteristics of this polymer are better than the corresponding characteristics of the compared commercial type. When the respective polymers are blended respectively in a standard oil recipe and tested with standard laboratory traction devices, the new polymer of this invention registers about 21 percent improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) Polymer; 70 ISAF Black; 43 Oil; 2.5 ZnO; 2.0 Stearic Acid; 1.0 Santoflex 13; 1.7 Sulfur; 1.4 Cyclix B. This is cured for 30 minutes at 300° F. and gives the following test results:

| | Commercial Type | New Polymer |
|---|---|---|
| Stanley-London Wet Skid Resistance Index: | | |
| Surface CF 0.09 | 100 | 100 |
| Surface CF 0.4 | 91 | 114.7 |
| Surface CF 0.6 | 89 | 108 |
| Young's Bending Modulus (cured 30 minutes at 300° F.) Index: | | |
| At 10,000 psi, °C. | −71 | −55 |

EXAMPLE V

The procedures of Examples I and II are repeated with similar results using equivalent amounts of other sodium alkyls or aryls:
 a. n-Amyl sodium
 b. t-Amyl sodium
 c. n-Pentyl-2-sodium
 d. 2,5-Dimethylhexyl-2-sodium
 e. n-Hexyl-2-sodium
 f. Cumyl sodium
 g. 2-Phenylethyl-2-sodium
 h. alpha-Naphthyl sodium
 i. Phenyl sodium
 j. 1-Methylnaphthalene-2-sodium

EXAMPLE VI

The procedures of Examples I and III are repeated except that equivalent amounts of finely divided KOH are used in place of the LiOH. In each polymerization the gel formation is substantially zero, and the results are given below in Table II.

TABLE II

| Molar Ratio KOH/n-BuNa | Cat. Conc.* | cis 1,4 % | I.R. trans | % 1,2 | DSV |
|---|---|---|---|---|---|
| 0.66/1 | 4.58 | 12.4 | 13.3 | 74.3 | 0.77 |
| " | 5.00 | 10.2 | 13.2 | 76.5 | 0.77 |
| 0.5/1 | 2.02 | 13.0 | 13.5 | 73.5 | 1.08 |
| " | 3.02 | 12.5 | 13.1 | 74.4 | 0.81 |
| " | 4.02 | 12.7 | 12.7 | 74.6 | 0.64 |
| " | 8.07 | 13.2 | 14.0 | 72.8 | 0.51 |
| " | 10.1 | 13.1 | 14.6 | 72.3 | 0.43 |
| " | 12.1 | 14.3 | 14.6 | 71.1 | 0.32 |
| " | 20.2 | 14.4 | 16.5 | 69.0 | 0.27 |
| 0.25/1 | 2.71 | 13.2 | 13.5 | 73.3 | 0.79 |
| " | 3.07 | 14.0 | 13.4 | 72.6 | 0.76 |
| " | 3.21 | 11.6 | 13.6 | 74.8 | 0.72 |
| " | 3.38 | 13.1 | 13.7 | 73.2 | 0.70 |
| " | 3.71 | 11.6 | 14.0 | 74.4 | 0.66 |
| " | 3.89 | 12.0 | 13.7 | 74.4 | 0.66 |
| " | 4.06 | 13.0 | 13.9 | 73.1 | 0.60 |
| " | 4.40 | 11.8 | 14.2 | 74.0 | 0.50 |

*Millimoles of catalyst per 100
parts of butadiene.

*Millimoles of catalyst per 100 parts of butadiene.

EXAMPLE VII

The procedures of Examples I and II are repeated a number of times with similar results using in place of the butadiene an equivalent weight respectively of:
a. Isoprene
b. Chloroprene
c. Piperylene
d. 2-Phenyl-1,3-butadiene
e. 75–25 mixture of butadiene and styrene
f. 70–30 mixture of butadiene and vinyl toluene
g. 80–20 mixture of butadiene and n-butene-1
h. 70–30 mixture of butadiene and isoprene
i. 75–25 mixture of isoprene and n-hexene-1

EXAMPLE VIII

The procedures of Examples I and II are repeated with similar results using in place of the hexane an equivalent amount respectively of benzene, toluene, n-octane, cyclohexane and methylcyclohexane.

EXAMPLE IX

Halide-free n-butyl Na is prepared by the following procedure: To 600 ml. of a hexane solution containing 1 mole of halide-free n-BuLi there is added with stirring and under a nitrogen atmosphere 600 ml. of a cyclohexane solution containing 1.mole of Na t-amyloxide. The n-Bu Na precipitate is filtered and washed under nitrogen several times with cyclohexane. This material upon analysis shows a Li content of only 0.44 percent.

EXAMPLE X

A number of 28-ounce polymerization bottles are charged and polymerizations of butadiene effected at 30° C. for 4 hours as in Example III. The charge consists of 60 gm. of butadiene in 260 gm. of hexane solution. This added to the moisture free bottle after it has been flushed with nitrogen. The bottle is sealed and brought to a temperature of 30° C. Using the n-butyl Na prepared in Example IX, the halide-free catalyst mixture is added under 50 psi of nitrogen pressure by a hypodermic syringe inserted through the rubber liner in the sealing cap of the bottle. The bottle is rotated for 4 hours in a polymerization bath maintained at 30° C. The catalyst compositions and results are given in the table below. A yield of approximately 100 percent Polymer is obtained in each case.

| mMoles n-BuNa/ 100 gms. Butadiene | mMoles LiOH | DSV | % Conv. | % 1,2 | $T_g$ °C. |
|---|---|---|---|---|---|
| 4.3 | 0.17 | 0.47 | 100 | 67 | −40 |
| 4.3 | 0.4 | 1.5 | 100 | 53 | −57 |
| 4.3 | 0.8 | 1.75 | 100 | 47 | −62 |
| 4.3 | 1.7 | 2.5 | 100 | 45 | −67 |

These results with halide-free catalyst are similar to those of Examples II and III which use the catalyst containing sodium chloride, thus showing that the chloride is not an essential component of the system.

EXAMPLE XI

The procedure of Example X is repeated using KOH in place of LiOH with the following results:

| mMoles n-BuNa/ 100 gms. Butadiene | mMoles KOH | DSV | % Conv. | % 1,2 | $T_g$ °C. |
|---|---|---|---|---|---|
| 4.3 | 0.70 | 0.70 | 100 | 52 | −59 |
| 4.3 | 0.4 | 1.40 | 100 | 50 | −61 |
| 4.3 | 0.8 | 1.53 | 100 | 47 | −62 |
| 4.3 | 1.7 | 2.0 | 100 | 45 | −67 |

These results with halide-free catalyst are similar to those of Example VI which use the catalyst containing sodium chloride, thus showing that the chloride is not an essential component of the system.

EXAMPLE XII

The procedure of Example X is repeated using in place of the n-BuNa equivalent weights respectively of n-amyl Na, and n-pentyl-2-Na. These are prepared halide-free by the procedure of Example I. The products have DSV's of 0.54, 1.6, 1.82 and 2.65, and 0.51, 1.49, 1.79 and 2.48 respectively.

EXAMPLE XIII

The procedure of Example XI is repeated using equivalent weights respectively of n-amyl Na, isopentyl Na and t-butyl Na prepared halide-free by the procedure of Example IX. The products have the following properties:

| | Cat. Conc. | % 1,2 | DSV |
|---|---|---|---|
| KOH/n-amyl Na 0.5/1 | 0.6 | 70.5 | 1.55 |
| " | 0.8 | 73.0 | 1.40 |
| " | 1.0 | 72.0 | 1.10 |
| " | 1.6 | 76.9 | 0.78 |
| KOH/isopentyl Na 0.5/1 | 70.0 | | 1.4 |
| " | 0.8 | 73.5 | 1.3 |
| " | 1.0 | 72.9 | 1.0 |
| " | 1.6 | 75.8 | 0.8 |
| KOH/t-butyl Na 0.5/1 | 0.6 | 73.0 | 1.5 |
| " | 0.8 | 72.5 | 1.32 |
| " | 1.0 | 75.0 | 1.05 |
| " | 1.6 | 77.0 | 0.9 |

EXAMPLE XIV

The procedure of Example X is repeated using as the monomer a mixture of 75 percent butadiene and 25 percent styrene with the following results:

| | |
|---|---|
| Mol. Wt. | 98,000 |
| % 1,2 | 47 |
| Processibility | Good |
| $T_g$ °C. | −62 |
| % Block | 0 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for the hydrocarbon solution polymerization of a monomer composition containing at least 70 percent conjugated diene comprising the steps of maintaining said monomer composition at a temperature of no more than 125° C. in intimate contact with a catalyst composition consisting essentially of:
   a. a sodium hydrocarbon having 1–10 carbon atoms therein selected from the class consisting of sodium alkyls and sodium aryls; and
   b. lithium hydroxide or potassium hydroxide;
the concentration of said catalyst composition being 0.1–4.5 millimoles of catalyst per 100 grams of said monomer composition, and said hydroxide being present in said catalyst composition in a ratio of 1.5–3 moles per mole of sodium hydrocarbon, said polymerization being conducted for a period of at least 1 hour said polymerized diene polymer having at least 35 percent 1,2 configuration.

2. The process of claim 1 in which said hydroxide is lithium hydroxide.

3. The process of claim 2 in which said conjugated diene is 1,3-butadiene.

4. The process of claim 2 in which said monomer composition is essentially all 1,3-butadiene.

5. The process of claim 4 in which said sodium hydrocarbon is sodium n-butyl.

6. The process of claim 5 in which said temperature is about 30° C.

7. The process of claim 4 in which said temperature is about 30° C.

8. The process of claim 4 in which said polymerization is conducted for at least 10 hours.

9. The process of claim 4 in which said ratio of hydroxide to sodium hydrocarbon is approximately two.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst composition is present at a concentration of 0.3–1.0 millimoles per 100 grams of said monomer.

13. The process of claim 1 in which said monomer composition is dissolved in a liquid hydrocarbon having a boiling point no higher than 110° C.

* * * * *

UNITED STATES PATENT OFFICE
CERTIFICATE OF CORRECTION

Patent No. 3,692,883  Dated September 19, 1972

Inventor(s) GARY L. SOMMARS and ADEL F. HALASA

It is certified that error appears in the above-identified patent and that said Letters Patent are hereby corrected as shown below:

Title page, following [72] Inventors:, the following should be added:

[73] Assignee: The Firestone Tire & Rubber Company
                      Akron, Ohio Col. 4, line 6, first occurrence, "used" should read --are--

Col. 6, Table II, 4th column, "I.R. trans" should read --I.R. trans 1,4%--

Col. 7, top of page, "*Millimoles of catalyst per 100 parts of butadiene" has been duplicated line 48, after "This" and before "added" the word --is-- has been omitted Col. 8, Example XI, 2nd column, "0.70" should read --0.17--

Example XIII, line 48 should read:

--KOH/isopentyl Na    0.6    71.0    1.4 --
        0.5/1

Signed and sealed this 3rd day of April 1973.

(SEAL)
Attest:

EDWARD M. FLETCHER, JR.          ROBERT GOTTSCHALK
Attesting Officer                 Commissioner of Patents